US008228204B2

(12) United States Patent
Tofighbakhsh

(10) Patent No.: US 8,228,204 B2
(45) Date of Patent: Jul. 24, 2012

(54) METHOD FOR CREATING A VIRTUAL FENCE USING A DEVICE WITH VOICE SIGNATURE PROCESSING AND GEOGRAPHIC LOCATOR CAPABILITY

(75) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 882 days.

(21) Appl. No.: 12/342,472

(22) Filed: Dec. 23, 2008

(65) Prior Publication Data
US 2010/0161338 A1 Jun. 24, 2010

(51) Int. Cl.
*G08B 23/00* (2006.01)
(52) U.S. Cl. ............... 340/573.4; 340/541; 340/539.11; 340/539.13
(58) Field of Classification Search ................ 340/573.4
See application file for complete search history.

(56) References Cited

U.S. PATENT DOCUMENTS

| 6,762,684 B1* | 7/2004 | Camhi | 340/573.1 |
| 7,123,141 B2* | 10/2006 | Contestabile | 340/539.13 |
| 7,248,170 B2* | 7/2007 | DeOme et al. | 340/573.1 |
| 2005/0280546 A1* | 12/2005 | Ganley et al. | 340/573.4 |
| 2008/0091425 A1* | 4/2008 | Kane | 704/246 |

OTHER PUBLICATIONS

"GPS Sex Offender Tracking" [Online], retrieved from the Internet at gps-practice-and-fun.com/offender-tracking.html on Dec. 22, 2008.
"Garmin: What is GPS?" [Online], retrieved from the Internet at garmin.com/aboutGPS/ on Dec. 22, 2008.

* cited by examiner

*Primary Examiner* — George Bugg
*Assistant Examiner* — Kerri McNally
(74) *Attorney, Agent, or Firm* — Greenblum & Bernstein, P.L.C.

(57) ABSTRACT

A client device for creating a virtual fence includes a locator that determines a location of the client device. The client device includes a receiver that receives speech data and transmits the speech data to a speech processor that isolates an individual voice signature from the speech data. The client device includes a profile storage that stores profile information of a user of the client device. The client device includes an alarm generator that generates an alarm based on the isolated individual voice signature and the location of the client device.

17 Claims, 7 Drawing Sheets

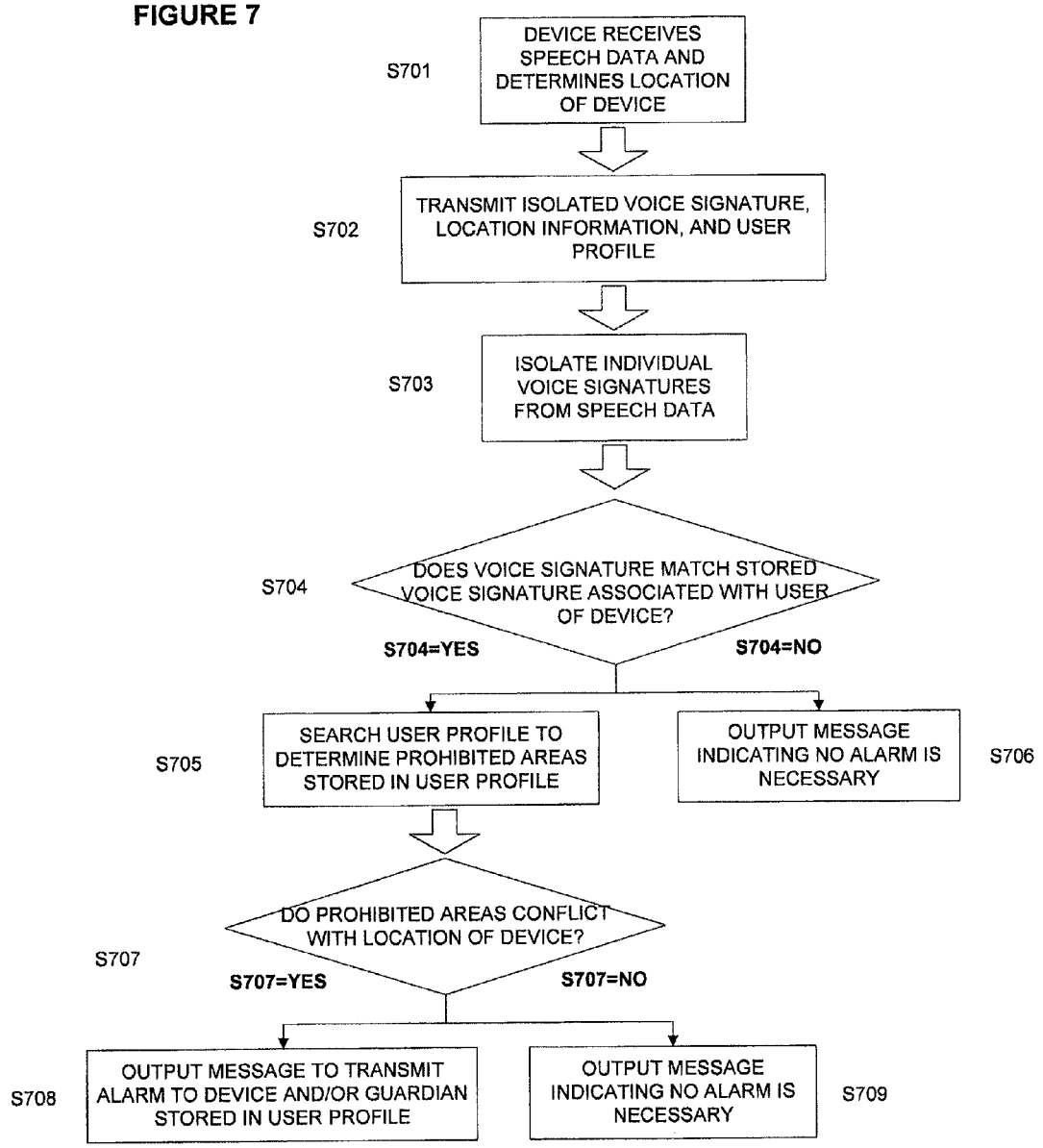

METHOD FOR CREATING A VIRTUAL FENCE USING A DEVICE WITH VOICE SIGNATURE PROCESSING AND GEOGRAPHIC LOCATOR CAPABILITY

BACKGROUND

1. Field of the Disclosure

The present disclosure relates to the field of biometrics and speech processing. More particularly, the present disclosure relates to method for creating a virtual fence using a device with voice signature processing and geographic locator capabilities.

2. Background Information

Conventional global positioning satellite (GPS) receiver devices may determine the location of a device. Global positioning system receivers use signal information received from a number of orbiting satellites to triangulate the location of a device. That is, the distance between the device and a global positioning system satellite may be determined based on the difference between the time at which a satellite signal was received and the time at which the signal was transmitted. By obtaining this information from number of satellite signals, the position of the device can be determined.

BRIEF DESCRIPTION OF THE DRAWINGS

FIG. 7 is a flowchart depicting an exemplary process of creating a virtual fence using a device with voice signature processing and geographic locator capabilities, according to an aspect of the present disclosure.

DETAILED DESCRIPTION

Figure 1:
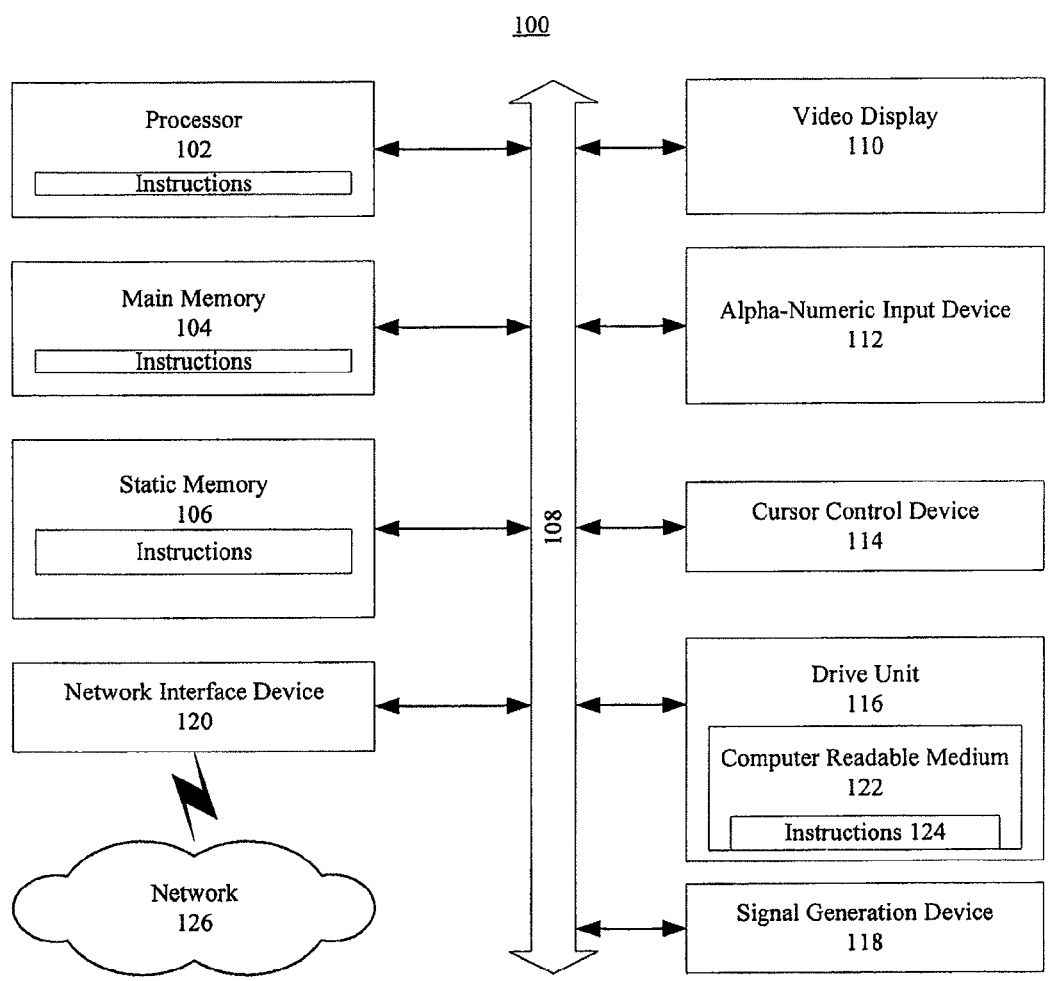
FIG. 1 shows an exemplary general computer system that includes a set of instructions for creating virtual fence using a device with voice signature processing and geographic locator capabilities.

In view of the foregoing, the present disclosure, through one or more of its various aspects, embodiments and/or specific features or sub-components, is thus intended to bring out one or more of the advantages as specifically noted below.

According to an aspect of the present disclosure, a client device for creating a virtual fence includes a locator that determines a location of the client device. The client device includes a receiver that receives speech data and transmits the speech data to a speech processor that isolates an individual voice signature from the speech data. The client device includes a profile storage that stores profile information of a user of the client device. The client device includes an alarm generator that generates an alarm based on the isolated individual voice signature and the location of the client device.

According to another aspect of the present disclosure, the client device includes a transmitter that transmits a message to a predetermined recipient based on the alarm.

According to yet another aspect of the present disclosure, the message is at least one of text message, electronic mail and automated telephone message.

According to still another aspect of the present disclosure, the speech processor transmits the isolated voice signature to a profile processor and the profile processor stores a profile for each of a number of individuals.

According to an aspect of the present disclosure, the profile comprises a profile voice signature, prohibited areas, restricted access areas and permitted areas.

According to another aspect of the present disclosure, profile information is obtained from a number of databases.

According to yet another aspect of the present disclosure, the restricted access areas are restricted based on time of day, day of week and month of year.

According to still another aspect of the present disclosure, the restricted access areas are indicated by a geographic location, a radius of geographic locations, a category of buildings and a category of geographic locations, permitted areas are indicated by a geographic location, a radius of geographic locations, a category of buildings and a category of geographic locations, and prohibited access areas are indicated by a geographic location, a radius of geographic locations, a category of buildings and a category of geographic locations.

According to an aspect of the present disclosure, the profile processor searches for a matched profile based on matching the isolated voice signature with a profile voice signature for the matched profile.

According to yet another aspect of the present disclosure, the profile processor determines whether the location of the client device overlaps with at least one of prohibited areas and restricted access areas indicated by the matched profile.

According to yet another aspect of the present disclosure, the client device includes a transmitter that transmits a message including information relating to overlap between the location of the client device and at least one of the prohibited areas and the restricted access areas indicated by the matched profile to at least one of: law enforcement, a legal guardian, a school board and a financial institution.

According to an aspect of the present disclosure, the locator that determines the location of the client device using a global positioning system.

According to an aspect of the present disclosure a method for creating a virtual fence includes determining a location of a client device. The method includes receiving speech data and transmitting the speech data to a speech processor that isolates an individual voice signature from the speech data. The method includes storing profile information for a user of the client device. The method includes generating an alarm based on the isolated individual voice signature and the location of the client device.

According to another aspect of the present disclosure, the method includes determining a stress level associated with the isolated voice signature for the user of the client device.

According to yet another aspect of the present disclosure, the method includes determining whether the stress level exceeds a predetermined threshold.

According to still another aspect of the present disclosure, the method includes transmitting a message to a predetermined recipient when the stress level associated with the isolated voice signal exceeds the predetermined threshold.

According to an aspect of the present disclosure, the profile information for the user comprises prohibited areas, restricted access areas and permitted areas for the user.

According to another aspect of the present disclosure, the profile information is updateable over the Internet.

According to yet another aspect of the present disclosure, the method includes transmitting a message to a predetermined recipient when the location of the client device overlaps with one of the prohibited areas and restricted access areas for the user.

According to an aspect of the present disclosure, a tangible computer readable medium that stores a program, recorded on the tangible computer readable medium, for creating a virtual fence includes a locator code segment, recorded on the computer readable medium, executable to determines a location of the client device. The tangible computer readable medium includes a receiver code segment, recorded on the computer readable medium, executable to receive speech data and transmit the speech data to a speech processor that isolates an individual voice signature from the speech data. The tangible computer readable medium includes a profile storage code segment, recorded on the computer readable medium, executable to store profile information for a user of the client device. The tangible computer readable medium includes an alarm generator code segment, recorded on the computer readable medium, executable generate an alarm based on the isolated individual voice signature and the location of the client device.

FIG. 1 is an illustrative embodiment of a general computer system, on which a method to create a virtual fence using a device with voice signature processing and geographic locator capabilities can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 126, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) receiver device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 102, for example, a central processing unit (CPU), a graphics processing unit (GPU), or both. Moreover, the computer system 100 can include a main memory 104 and a static memory 106 that can communicate with each other via a bus 108. As shown, the computer system 100 may further include a video display unit 110, such as a liquid crystal display (LCD), an organic light emitting diode (OLED), a flat panel display, a solid state display, or a cathode ray tube (CRT). Additionally, the computer system 100 may include an input device 112, such as a keyboard, and a cursor control device 114, such as a mouse. The computer system 100 can also include a disk drive unit 116, a signal generation device 118, such as a speaker or remote control, and a network interface device 120.

In a particular embodiment, as depicted in FIG. 1, the disk drive unit 116 may include a computer-readable medium 122 in which one or more sets of instructions 124, e.g. software, can be embedded. A computer-readable medium 122 is a tangible article of manufacture, from which sets of instructions 124 can be read. Further, the instructions 124 may embody one or more of the methods or logic as described herein. In a particular embodiment, the instructions 124 may reside completely, or at least partially, within the main memory 104, the static memory 106, and/or within the processor 102 during execution by the computer system 100. The main memory 104 and the processor 102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 122 that includes instructions 124 or receives and executes instructions 124 responsive to a propagated signal, so that a device connected to a network 126 can communicate voice, video or data over the network 126. Further, the instructions 124 may be transmitted or received over the network 126 via the network interface device 120.

Figure 2:
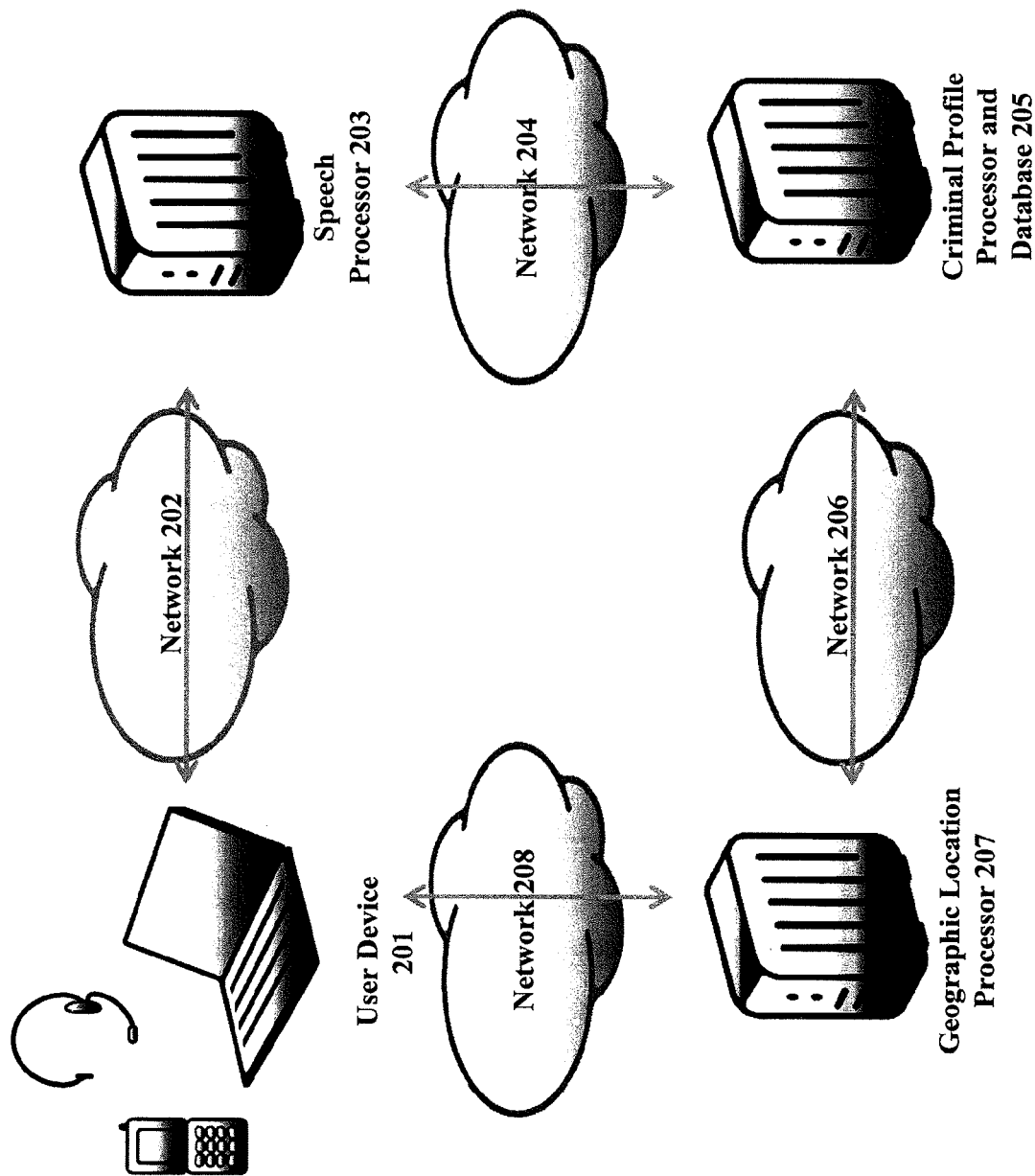
FIG. 2 illustrates an exemplary network connection between a user device, speech processor, and a criminal profile processor and database, according to an aspect of the present disclosure.

FIG. 2 illustrates an exemplary network connection between a user device, speech processor, and a criminal profile processor and database, according to an aspect of the present disclosure. Various types of user devices use speech processing services via network servers, including cell phones, personal digital assistants, MP3 players, satellite radio systems, etc. Furthermore, certain types of client devices include geographic locator capabilities; for example, certain types of cell phones, navigation systems, and personal digital assistants include global positioning systems (GPS).

In the exemplary architecture in FIG. 2, user device 201 is a client device with both speech processing capabilities and geographical locator capabilities. For example, user devices may include a client device which is capable of receiving speech data and isolating individual voice signatures. Thus, exemplary user devices may include, but are not limited to cell phones, watches, jewelry and pens which include speech processing units and geographical locator units. In FIG. 2, exemplary user device 201 may be used by users in analog, digital, or internet protocol (IP) telephone network systems. Thus, the network system may be a public switched telephone network (PSTN), digital telephone network system, a voice over internet protocol (VOIP) telephony network system, or any other audible communication network.

In the exemplary embodiment in FIG. 2, additional speech processing is performed by a speech processor 203, to which user device 201 transmits isolated individual voice signatures. However, in an alternative embodiment, user device 201 may receive speech data, and transmit the speech data to the speech processor 203. Speech processor 203 isolates individual voice signatures and performs additional speech processing. In this alternative embodiment, user device 201 requires less processing power, facilitating the use of more compact user devices. In one non-limiting embodiment, user device 201 receives and amplifies a speech signal or signals prior to isolating an individual voice signature. In another non-limiting embodiment, user device 201 receives and amplifies a speech signal or signals prior to transmitting speech data to speech processor 203. For example, a receiver implemented on user device 201 may be able to pick up a speech signal from anywhere within a predetermined radius (i.e. a 50-meter radius around user device 201).

The isolated voice signature is then transmitted to criminal profile processor and database 205. Criminal profile processor and database 205 includes profiles with voice signatures and information related to individuals with criminal backgrounds. Alternatively, criminal profile processor and database 205 also includes profiles with voice signatures and information related to individuals who are prohibited from entering certain restricted areas. The profile information stored in criminal profile processor and database 205 includes areas and types of geographical areas where certain individuals are prohibited. For example, particular individuals may not be allowed or permitted within a certain radius surrounding schools or playgrounds with small children. Furthermore, if criminal profile processor and database 205 determines that the isolated voice signature matches a profile of an individual in its database, then criminal profile processor and database 205 will transmit a list of the types of restricted areas to geographic location processor 207. In one embodiment, the types of restricted areas are particular to the individual for which a profile is stored. For example, types of restricted areas may include, but are not limited to playgrounds, elementary schools, and daycare centers.

Geographic location processor 207 receives the geographic location of user device 201. Geographic location processor 207 determines a geographic area, or types of buildings or areas that are located within a predetermined radius of the geographic location of the user device 201. This type of information may be found in map and directory databases. For example, geographic location processor 207 may query a database to obtain businesses, buildings, and residences within a half mile radius of the geographic location of user device 201. The query results will include categories of building and areas, such as "restaurant", "playground", "library", "elementary school" and "bank". Then, geographic location processor 207 determines whether one of the categories obtained as a result of the query matches one of the types of prohibited areas, which was determined by criminal profile processor and database 205. If there is a match between categories obtained as a result of the query and prohibited areas determined by criminal processor and database 205, then geographic location processor 207 transmits a message to user device 201 to generate an alarm and/or transmit an alert message to a communication device for law enforcement authorities or other security personnel (e.g., an e-mail alert sent to a police dispatch center).

In an alternative embodiment, criminal profile processor and database 205 finds a match for an isolated individual voice signature in its database. The profile of the individual matching the isolated voice signature may indicate that the individual is wanted by authorities or is missing. For example, the profile may indicate that there is an "All Points Bulletin" (APB) or "Amber Alert" (i.e., an alert for a missing child) associated with the profile, and accordingly, the individual. In such instance, geographic location processor 207 determines the geographic location of user device 201, transmits an alert message to user device 201, and transmits an alert message with the geographic location of user device 201 to a communication device for law enforcement or other security personnel (e.g., an e-mail alert sent to a police dispatch center).

In the exemplary embodiment shown in FIG. 2, user device 201, speech processor 203, criminal profile processor and database 205, and geographic location processor 207 are individual units connected via networks 202, 204, 206, and 208. However, in alternative embodiments, one or more of user device 201, speech processor 203, criminal profile processor and database 205, and geographic location processor 207 may be combined in a single device.

Furthermore, user device 201, speech processor 203, criminal profile processor and database 205, and geographic location processor 207 may be connected via multiple networks 202, 204, 206, and 208 or a single network. It is understood that the network communication node may be implemented in any data network(s) accessible by the users including, but not limited to: wide area networks (WANs), PSTNs, and the internet (using, for example, voice over internet protocol), without departing from the spirit and scope of the present disclosure. In one non-limiting embodiment, each of networks 202, 204, 206, and 208 are heterogeneous to one another. In another non-limiting embodiment, each of networks 202, 204, 206, and 208 are homogeneous with one another.

Figure 3:
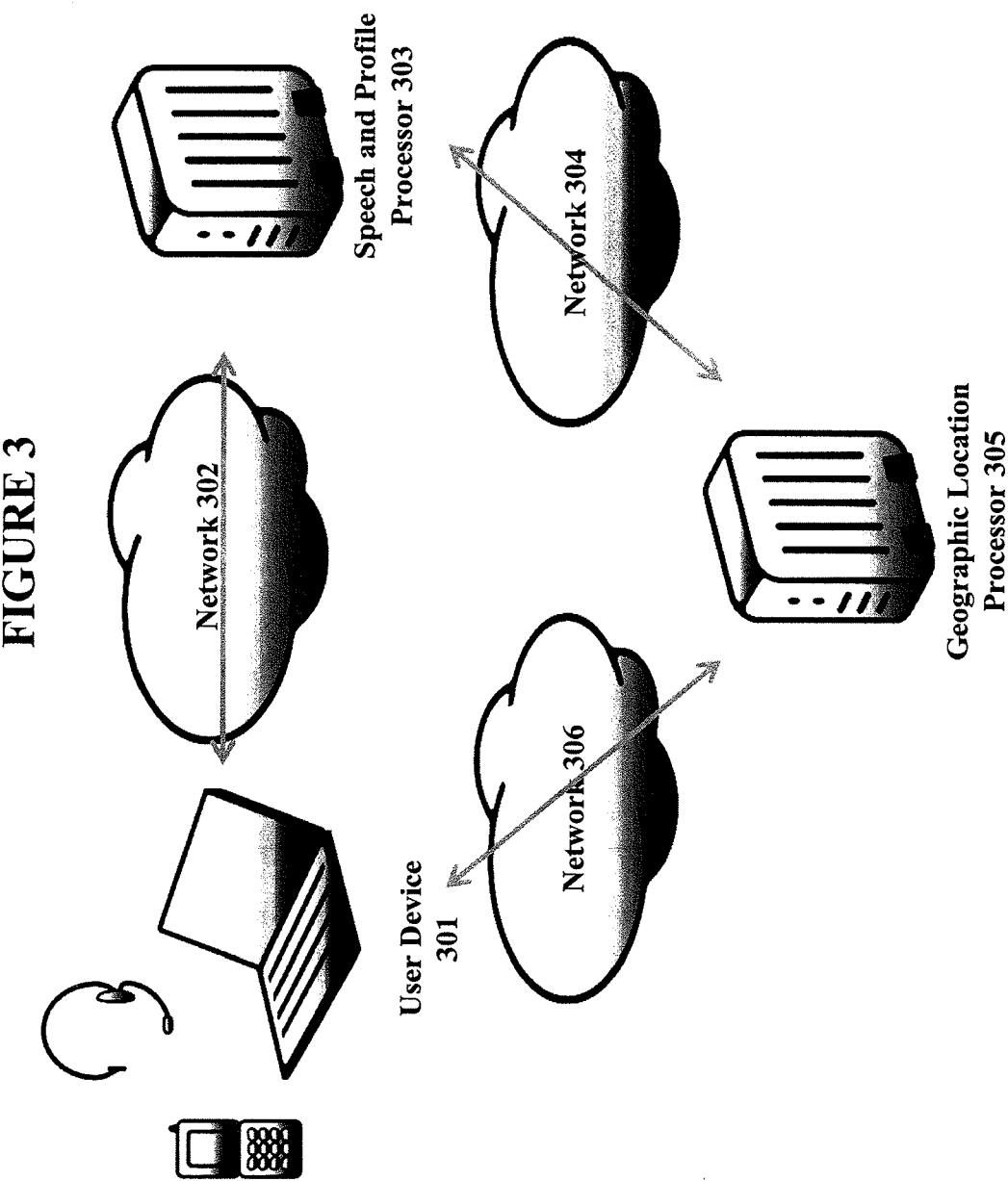
FIG. 3 illustrates another exemplary network connection between a user device, speech processor, and a geographic location processor, according to an aspect of the present disclosure.

FIG. 3 illustrates another exemplary network connection between a user device, speech processor, and a geographic location processor, according to an aspect of the present disclosure. In the embodiment illustrated in FIG. 3, user device 301 receives speech data. User device 301 isolates an individual voice signature from this speech data; alternatively, user device 301 transmits the raw speech data to speech and profile processor 303 via network 302, and speech and profile processor 303 isolates an individual voice signature from this speech data. Speech and profile processor 303 determines whether the isolated voice signature matches a stored voice signature for a user of the client device. If the isolated voice signature matches the stored voice signature, speech and profile processor 303 determines a stress level corresponding to the isolated voice signature. For example, speech recognition software or emotion recognition software may recognize stress patterns in voice signatures, corresponding to anger, fear, or distress; alternatively, speech recognition software may recognize stress levels in speech data, based on spoken words that are characterized as being negative, and that are recognized by the speech recognition software.

When speech and profile processor 303 recognizes a stress level over a predetermined threshold, the speech processor transmits an alert message to user device 301. In turn, user device 301 transmits an alert message to a predetermined recipient stored in user device 301, such as a guardian, caretaker, or parent. The alert message may be transmitted by any of, but not limited to, e-mail, automated telephone message, and text message.

In an alternative embodiment, user device 301 receives speech data and isolates and recognizes a stored voice signature associated with a user of user device 301. User device 301 or speech and profile processor 303 stores a profile associated with a user of user device 301. This profile indicates geographic areas or locations that are permitted and prohibited to the user of user device 301. When user device 301 recognizes the stored voice signature associated with the user of user device 301, then the user device transmits the geographical location of user device 301 and a stored list of prohibited and/or permitted areas to speech and profile processor 303 via network 302. A geographic location is obtained from geographic location processor 305 via network 304. Geographic location processor 305 obtains a geographic location of the user device 301 via network 306. Speech and profile processor 303 determines whether the geographic location of user device 301 overlaps with the stored list of prohibited or permitted areas. If there is an overlap, speech and profile processor 303 transmits an alert message to user device 301. In turn, user device 301 transmits an alert message to a predetermined recipient stored in user device 301, such as a guardian, caretaker, or parent. The alert message may be transmitted by any of, but not limited to e-mail, automated telephone message, and text message. In one non-limiting embodiment, each of networks 302, 304, and 306 are heterogeneous to one another. In another non-limiting embodiment, each of networks 302, 304, and 306 are homogeneous with one another.

Figure 4:
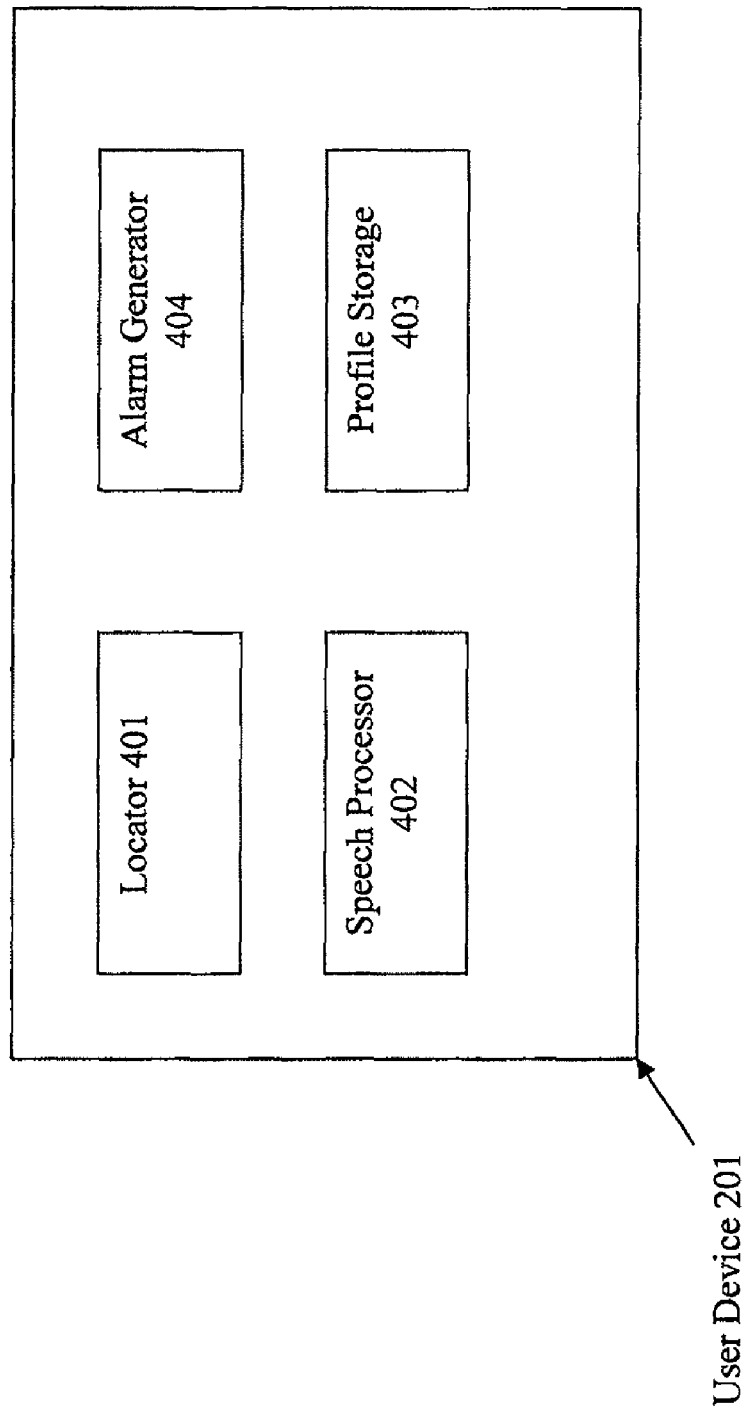
FIG. 4 illustrates an exemplary client device, according to an aspect of the present disclosure.

FIG. 4 illustrates an exemplary user device 201, according to an aspect of the present disclosure. In particular, FIG. 4 illustrates exemplary components (which include hardware and/or software elements) of user device 201, including locator 401, speech processor 402, profile storage 403, and alarm generator 404. Locator 401 (which includes hardware and/or software elements) is a unit that has geographic locator capabilities, such as a global positioning system (GPS) receiver unit. Speech processor 402 (which includes hardware and/or software elements) receives speech data. In another non-limiting embodiment, speech processor 402 transmits speech data to a remote speech processor for additional speech processing, such as speech processor 203 described above. Alternatively, speech processor 402 isolates an individual voice signature from received speech data. In another embodiment, user device 401 is configured to receive speech data when voice activated, in order to conserve energy. Profile storage 403 stores information associated with the user of user device 401 including, but not limited to, a name, address, age, description, photo, guardian contact information, and prohibited and/or permitted areas for the user of user device 201. Alarm generator 404 outputs an alarm message, signal, sound, and/or other visual indication. Alarm generator 404 outputs an alarm message to a predetermined recipient via contact information such an e-mail address, mobile phone number or telephone number for a guardian, stored in profile storage 403, or an alarm message to authorities.

Figure 5:
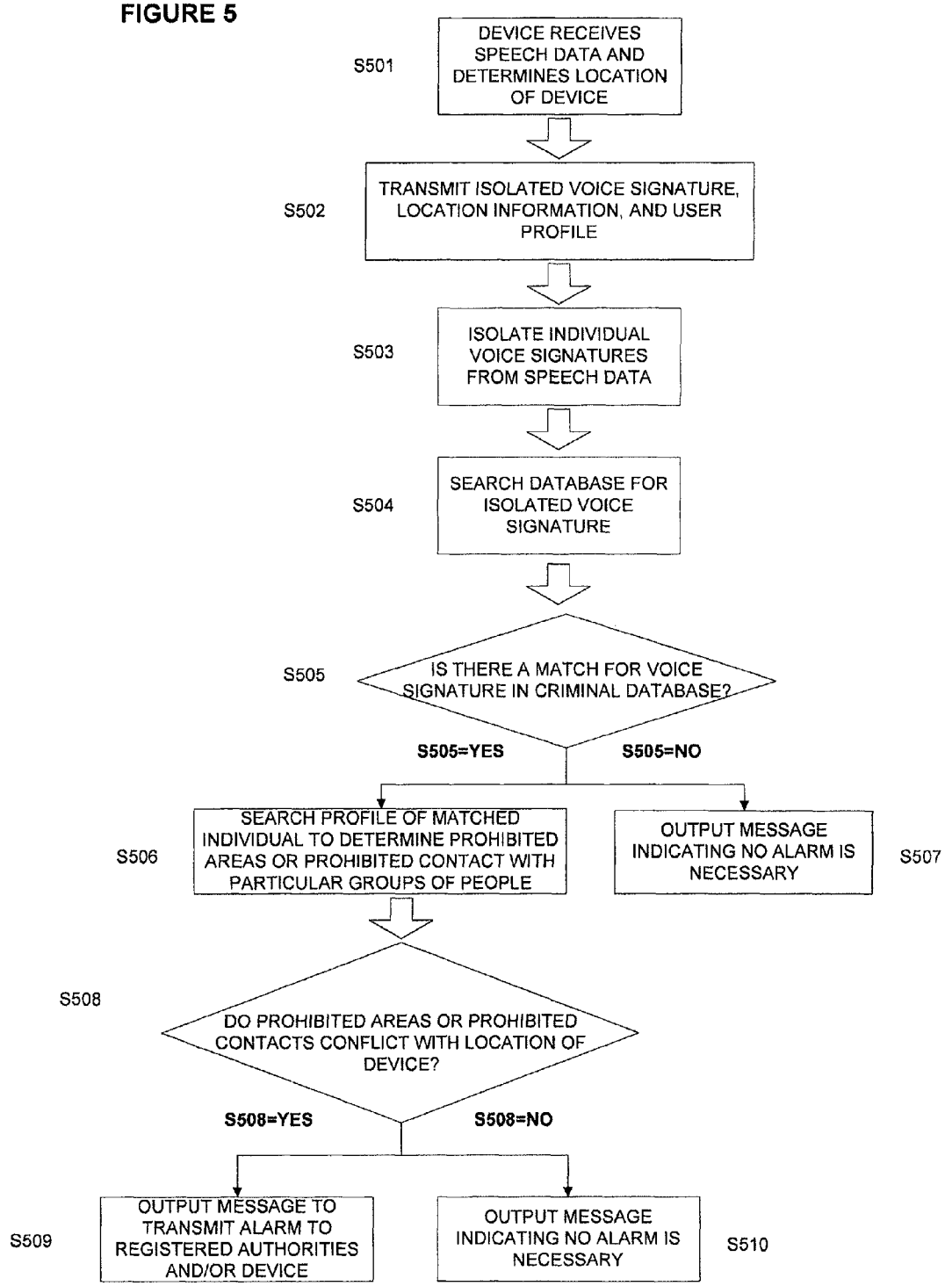
FIG. 5 is a flowchart depicting an exemplary process of creating a virtual fence using a device with voice signature processing and geographic locator capabilities, according to an aspect of the present disclosure.

FIG. 5 is a flowchart depicting an exemplary process of creating a virtual fence using a device with voice signature processing and geographic locator capabilities, according to an aspect of the present disclosure. As discussed in the description of FIGS. 2 and 4 above, in step S501, the user device 201 receives speech data and locator 401 of the user device and determines the geographic location of the user device.

In step S502, the user device transmits received speech data to speech processor 203. In step S502, the user device also transmits geographic location information, determined by locator 401, and user profile information, stored in profile storage 403, to the geographic location processor 207. Alternatively, the user device may transmit geographic location information and user profile information to geographic location processor 207, after step S506 or at a later point in the process.

In step S503, speech processor 203 isolates an individual voice signature from the received speech data. In an alternative embodiment, speech processor 402 of the user device isolates an individual voice signature from the received speech data. Speech processor 203 or speech processor 402 transmits the isolated voice signature to criminal profile processor and database 205.

In step S504, criminal profile processor and database 205 searches its database for the isolated voice signature. As shown in step S505, criminal profile processor and database 205 determines if there is a match for the isolated voice signature in the database of criminal profile processor and database 205. If no match exists, then criminal profile processor and database 205 outputs a message indicating no alarm is necessary to alarm generator 404 of the client device, as shown in step S507.

However, if a match is found for an individual associated with the isolated voice signature in step S505, then criminal profile processor and database 205 searches the profile of the matched individual. In step S506, criminal profile processor and database 205 determines prohibited areas, areas of restricted access or prohibited personal contacts indicated by the profile of the matched individual. For example, the profile of the matched individual may indicate that this individual is not permitted to have contact with children. Criminal profile processor and database 205 transmits the prohibited areas, restricted access areas and prohibited personal contacts, indicated by the profile of the matched individual, to geographic location processor 207. In step S508, geographic location processor 207 determines whether there is a conflict between the prohibited areas and prohibited personal contacts and the geographic location of the user device, as discussed above. If there is no conflict, then geographic location processor 207 transmits a message to alarm generator 404 of the client device, indicating that no alarm is necessary at step S510. However, if there is a conflict, then geographic location processor 207 outputs an alarm message to alarm generator 404 of the client device at step S509, as discussed above in the description of FIGS. 2 and 4.

Figure 6:
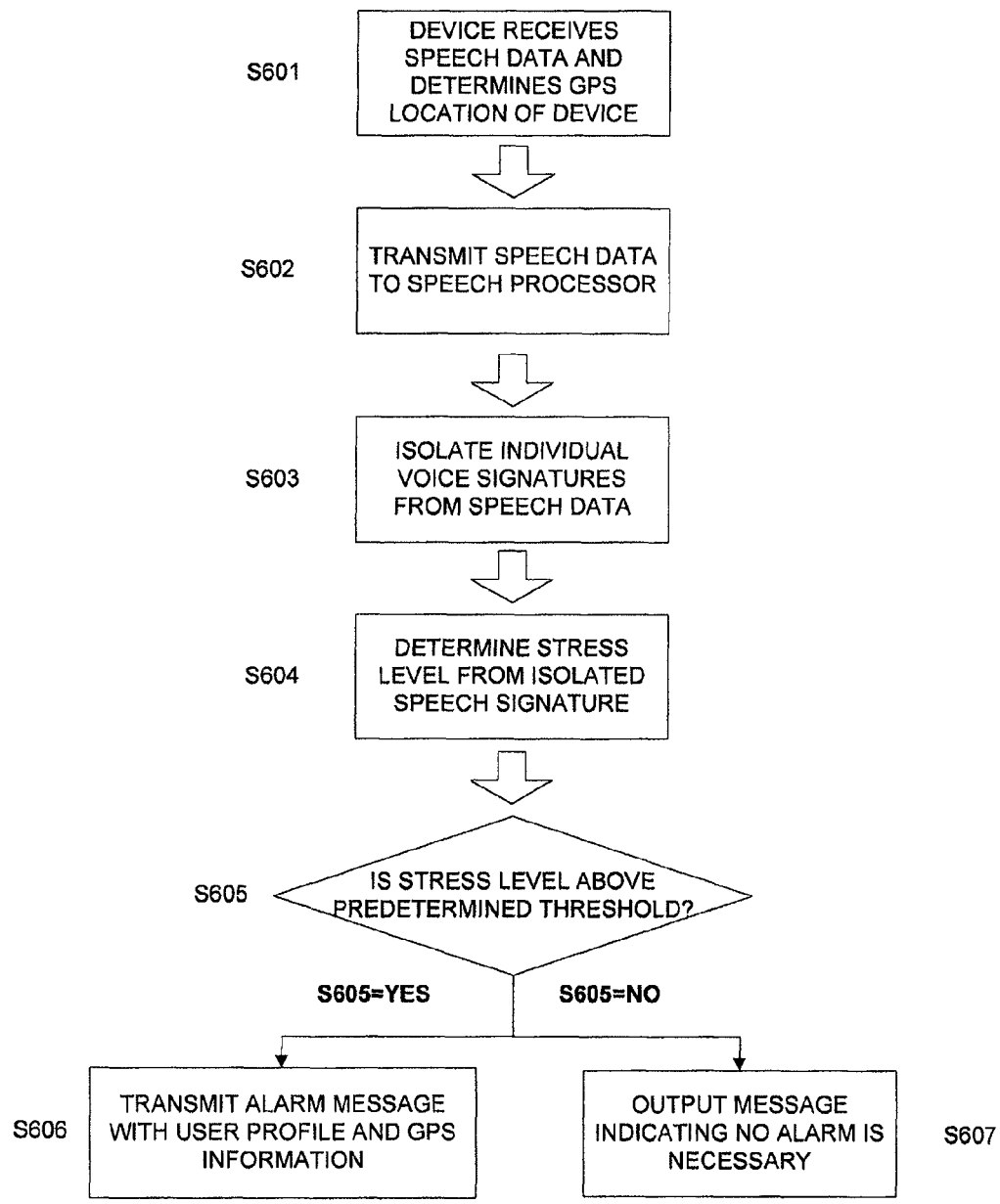
FIG. 6 is a flowchart depicting an exemplary process of creating a virtual fence using a device with voice signature processing and geographic locator capabilities, according to an aspect of the present disclosure.

FIG. 6 is a flowchart depicting an exemplary process of creating a virtual fence using a device with voice signature processing and geographic locator capabilities, according to an aspect of the present disclosure. As discussed in the description of FIGS. 3 and 4 above, in step S601, the user device 201 receives speech data and locator 401 of the user device determines the geographic location of the user device.

In step S602, the user device transmits received speech data to speech processor 303. In step S603, speech and profile processor 303 isolates an individual voice signature from the received speech data. In an alternative embodiment, speech processor 402 of the user device isolates an individual voice signature from the received speech data. Speech and profile processor 303 or speech processor 402 of the user device then determines the stress level of the isolated voice signature in step S604. As shown in step S605, speech and profile processor 303 or speech processor 402 of the user device determines whether the stress level is above a predetermined threshold. If the predetermined threshold is not reached, then speech and profile processor 303 or speech processor 402 of the user device outputs a message to alarm generator 404 of the user device indicating that no alarm is necessary in step S607. If the predetermined threshold is reached, then speech and profile processor 303 or speech processor 402 of the user device outputs a message to alarm generator 404 of the client device in step S606, as discussed above in the description of FIGS. 3 and 4. In step S606, alarm generator 404 of the user device also transmits user profile information and geographic location information to a predetermined recipient using contact information, such as an e-mail address and/or telephone number for guardians, stored in profile storage 403 of the user device.

FIG. 7 is a flowchart depicting an exemplary process of creating virtual fence using a device with voice signature processing and geographic locator capabilities, according to an aspect of the present disclosure. As discussed in the description of FIGS. 3 and 4 above, in step S701, the user device receives speech data and locator 401 of the user device determines the geographic location of the user device.

In step S702, the user device transmits received speech data to speech and profile processor 303. In step S702, the user device also transmits geographic location information, determined by locator 401, and user profile information, stored in profile storage 403, to geographic location processor 305. In addition, the user device transmits profile information to the speech and profile processor, including a stored voice signature associated with a user of the user device. In an alternative embodiment, the speech and profile processor stores the voice signature of a user of the user device. Alternatively, the user device may transmit geographic location information and user profile information to geographic location processor 305, after step S706 or at a later point in the process.

Then, in step S703, speech and profile processor 303 isolates an individual voice signature from the received speech data. In an alternative embodiment, speech processor 402 of the user device isolates an individual voice signature from the received speech data. In step S704, speech and profile processor 305 then determines whether the isolated voice signature matches the stored voice signature associated with a user of the user device. If the voice signature does not match the stored voice signature, then speech and profile processor 305 outputs a message indicating no alarm is necessary to alarm generator 404 of the client device, as shown in step S706.

However, if the voice signature matches the stored voice signature, the speech and profile processor 303 searches a user profile associated with the stored voice to determine prohibited areas, restricted access areas, and permitted areas indicated by the user profile in step S705. Speech and profile processor 303 then transmits the prohibited areas, restricted access areas, and permitted areas to geographic location processor 305. In step S707, geographic location processor 305 determines whether the geographic location of the user device overlaps with the prohibited areas or the restricted access areas. If there is no conflict, then geographic location processor 305 transmits a message to alarm generator 404 of the client device, indicating that no alarm is necessary at step S709. However, if there is a conflict, then geographic location processor 305 outputs an alarm message to alarm generator 404 of the user device at step S708, as discussed above in the description of FIGS. 2 and 4. Alarm generator 404 of the user device also transmits an alarm message to a predetermined recipient using stored contact information for the recipient.

Accordingly, the present invention creates a virtual fence around the user of the user device, keeping the user within a permitted area or keeping unauthorized individuals out of prohibited areas.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the present disclosure may be implemented in a manner that combines the elements of the embodiments described in FIGS. 5, 6, and 7. As an alternative, note that a location check may be performed first, so not no speech processing is required for unfenced areas. In this alternative embodiment, the user device would detect stress levels in a user of the user device, while determining whether unauthorized persons are in the vicinity of the user of the user device and/or determining whether the user of the user device is in a prohibited area. If one or more of these parameters were present, the user device would generate an alarm message to the user, a guardian of the user, or local authorities.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In one non-limiting example, a profile processor stores profiles of convicted felons. In a case where a convicted felon is a pedophile, prohibited areas may include categories of buildings for example, schoolyards, day care and day care centers. In a case where a convicted felon is a bank robber, restricted access areas may include financial institutions during the time of day that money pickups and drop-offs are scheduled. In a case where a profile indicates an individual against whom a restraining order is sought, prohibited areas may include a radius of geographic locations, for example a 100 yard radius around a person seeking the restraining order. Prohibited areas for a convicted felon may also include categories of buildings, for example, specified government buildings.

In another non-limiting example, a profile processor stores profiles of employees. A profile may store information indicating restricted access areas, for example, areas restricted based on security clearance. Accordingly, a profile indicating an employee with a "SECRET" security clearance may be prohibited from entering government buildings after 10:00 PM. Alternatively, a profile for an employee indicating a "CLASSIFIED" security clearance may be prohibited from entering specified military installations.

In yet another non-limiting embodiment, a profile processor stores profiles of suspects in crimes. Prohibited areas may include a category of geographic locations, for example, all crime scenes at which a homicide occurred in the last two weeks. Categories of geographic locations differ from categories of buildings insofar as the geographic locations may not be associated with any structure or entity.

In still another non-limiting embodiment, a user of the client device is a evacuee from a flood zone. The profile information stored in the client device indicates that the evacuee's home is a restricted access area during a 36-hour time period when a flood is expected to occur. Accordingly, if the user of the client device returns to their home, authorities will be notified of their entry into an evacuated area.

In another non-limiting embodiment, a user of the client device is a child and the profile information is determined by a parent. The parent may update prohibited areas to include bars and nightclubs. The parent may also update restricted access areas to include malls during non-school hours, or a significant other's home during daylight hours. The parent may also update the profile to include permitted areas such as school, the library and museums.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission standards and protocols for the Internet and other packet switched network transmission, e.g., SRGS (Speech Recognition Grammar Specification), SISR (Semantic Interpretation for Speech Recognition), SSML (Speech Synthesis Markup Language), PLS (Pronunciation Lexicon Specification), CCXML (Call Control Extensible Markup Language), represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A client device for creating a virtual fence, comprising:
   a locator that determines a location of the client device;
   a receiver that receives speech data and transmits the speech data to a speech processor that isolates an individual voice signature from the speech data;
   a profile storage that stores profile information of a user of the client device; and
   an alarm generator that generates an alarm based on the isolated individual voice signature and the location of the client device,
   wherein a profile for each of a plurality of individuals comprises a profile voice signature, prohibited areas, restricted access areas and permitted areas, and
   wherein the restricted access areas are restricted based on time of day, day of week and month of year.

2. The client device according to claim 1, further comprising:
   a transmitter that transmits a message to a predetermined recipient based on the alarm.

3. The client device according to claim 2,
   wherein the message is at least one of text message, electronic mail and automated telephone message.

4. The client device according to claim 1,
   wherein the speech processor transmits the isolated voice signature to a profile processor, and
   wherein the profile processor stores the profile for each of the plurality of individuals.

5. The client device according to claim 4,
   wherein the profile information is obtained from a plurality of databases.

6. The client device according to claim 1,
wherein the restricted access areas are indicated by at least one of a geographic location, a radius of geographic locations, a category of buildings and a category of geographic locations,
wherein prohibited access areas are indicated by at least one of a geographic location, a radius of geographic locations, a category of buildings and a category of geographic locations, and
wherein permitted areas are indicated by at least one of a geographic location, a radius of geographic locations, a category of buildings and a category of geographic locations.

7. The client device according to claim 4,
wherein the profile processor searches for a matched profile based on matching the isolated voice signature with a profile voice signature for the matched profile.

8. The client device according to claim 7,
wherein the profile processor determines whether the location of the client device overlaps with at least one of prohibited areas and restricted access areas indicated by the matched profile.

9. The client device according to claim 7, further comprising:
a transmitter that transmits a message comprising information relating to overlap between the location of the client device and at least one of the prohibited areas and the restricted access areas indicated by the matched profile to at least one of: law enforcement, a legal guardian, a school board and a financial institution.

10. The client device according to claim 1,
wherein the locator determines the location of the client device using a global positioning system.

11. A method for creating a virtual fence, comprising:
determining a location of a client device;
receiving speech data and transmitting the speech data to a speech processor that isolates an individual voice signature from the speech data;
storing profile information for a user of the client device; and
generating an alarm based on the isolated individual voice signature and the location of the client device,
wherein the profile information for the user comprises prohibited areas, restricted access areas and permitted areas for the user, and
wherein the restricted access areas are restricted based on time of day, day of week and month of year.

12. The method according to claim 11, further comprising:
determining a stress level associated with the isolated voice signature for the user of the client device.

13. The method according to claim 12, further comprising:
determining whether the stress level exceeds a predetermined threshold.

14. The method according to claim 13, further comprising:
transmitting a message to a predetermined recipient when the stress level associated with the isolated voice signal exceeds the predetermined threshold.

15. The method according to claim 11,
wherein the profile information is updateable over the Internet.

16. The method according to claim 15, further comprising:
transmitting a message to a predetermined recipient when the location of the client device overlaps with one of the prohibited areas and restricted access areas for the user.

17. A non-transitory computer readable medium that stores a program, recorded on the non-transitory computer readable medium, for creating a virtual fence, comprising:
a locator code segment, recorded on the computer readable medium, executable to determine a location of the client device;
a receiver code segment, recorded on the computer readable medium, executable to receive speech data and transmit the speech data to a speech processor that isolates an individual voice signature from the speech data;
a profile storage code segment, recorded on the computer readable medium, executable to store profile information for a user of the client device; and
an alarm generator code segment, recorded on the computer readable medium, executable to generate an alarm based on the isolated individual voice signature and the location of the client device,
wherein the profile information for the user comprises prohibited areas, restricted access areas and permitted areas for the user, and
wherein the restricted access areas are restricted based on time of day, day of week and month of year.

* * * * *